(12) United States Patent
Trese et al.

(10) Patent No.: US 10,140,320 B2
(45) Date of Patent: Nov. 27, 2018

(54) SYSTEMS, METHODS, AND MEDIA FOR GENERATING ANALYTICAL DATA

(75) Inventors: Andrew Trese, Somerville, MA (US); Frank Closset, Sint-Truiden (BE)

(73) Assignee: SDL Inc., Wakefield, MA (US)

( * ) Notice: Subject to any disclaimer, the term of this patent is extended or adjusted under 35 U.S.C. 154(b) by 220 days.

(21) Appl. No.: 13/037,273

(22) Filed: Feb. 28, 2011

(65) Prior Publication Data

US 2012/0221593 A1    Aug. 30, 2012

(51) Int. Cl.
*G06F 17/30* (2006.01)

(52) U.S. Cl.
CPC .. *G06F 17/30303* (2013.01); *G06F 17/30867* (2013.01); *G06F 17/30554* (2013.01); *G06F 17/30861* (2013.01)

(58) Field of Classification Search
CPC ................................................ G06F 17/30867
USPC ......................................................... 707/769
See application file for complete search history.

(56) References Cited

U.S. PATENT DOCUMENTS

| | | |
|---|---|---|
| D290,952 S | 7/1987 | Price |
| D291,086 S | 7/1987 | Price |
| 4,845,658 A | 7/1989 | Gifford |
| 4,916,614 A | 4/1990 | Kaji |
| 4,920,499 A | 4/1990 | Skeirik |
| 5,032,979 A * | 7/1991 | Hecht ................... G06F 21/552 713/164 |
| 5,351,189 A | 9/1994 | Doi |
| 5,418,717 A | 5/1995 | Su et al. |
| 5,640,575 A | 6/1997 | Maruyama |
| 5,677,835 A | 10/1997 | Carbonell et al. |
| 5,708,780 A | 1/1998 | Levergood et al. |
| 5,715,314 A | 2/1998 | Payne et al. |
| 5,724,424 A | 3/1998 | Gifford |
| 5,768,603 A | 6/1998 | Brown et al. |
| 5,812,776 A | 9/1998 | Gifford |
| 5,873,056 A | 2/1999 | Liddy |
| 5,909,492 A | 6/1999 | Payne et al. |
| 5,974,372 A | 10/1999 | Barnes |
| 6,014,628 A * | 1/2000 | Kovarik, Jr. ...................... 705/5 |

(Continued)

FOREIGN PATENT DOCUMENTS

| | | |
|---|---|---|
| AU | 5240198 A | 5/1998 |
| AU | 694367 B2 | 7/1998 |

(Continued)

OTHER PUBLICATIONS

Dunlap at al., "ReVirt: Enabling Intrusion Analysis through Virtual-Machine Logging and Replay", Dec. 11, 2002, USENIX Association.*

(Continued)

*Primary Examiner* — Apu Mofiz
*Assistant Examiner* — Sheryl Holland
(74) *Attorney, Agent, or Firm* — Carr & Ferrell LLP

(57) ABSTRACT

Systems, methods, and media for generating analytical data from actions performed on one or more publishing servers. Methods may include capturing one or more audit trails by determining actions performed on the one or more publishing servers via one or more client devices, the one or more publishing servers adapted to publish informational content; generating analytical data from the one or more audit trails; and storing the generated analytical data in a database.

16 Claims, 4 Drawing Sheets

(56) References Cited

U.S. PATENT DOCUMENTS

| | | |
|---|---|---|
| 6,044,344 A | 3/2000 | Kanevsky |
| 6,049,785 A | 4/2000 | Gifford |
| 6,085,162 A | 7/2000 | Cherny |
| 6,195,649 B1 | 2/2001 | Gifford |
| 6,199,051 B1 | 3/2001 | Gifford |
| 6,205,437 B1 | 3/2001 | Gifford |
| 6,212,634 B1 | 4/2001 | Geer et al. |
| 6,279,112 B1 | 8/2001 | O'toole, Jr. et al. |
| 6,347,316 B1 | 2/2002 | Redpath |
| 6,356,865 B1 | 3/2002 | Franz et al. |
| 6,415,257 B1 | 7/2002 | Junqua |
| 6,449,599 B1 | 9/2002 | Payne et al. |
| 6,477,524 B1 | 11/2002 | Taskiran |
| 6,490,358 B1 | 12/2002 | Geer et al. |
| 6,490,563 B2 | 12/2002 | Hon |
| 6,658,627 B1 | 12/2003 | Gallup |
| 6,865,528 B1 | 3/2005 | Huang |
| 6,920,419 B2 | 7/2005 | Kitamura |
| 6,976,207 B1 | 12/2005 | Rujan |
| 6,990,439 B2 | 1/2006 | Xun |
| 7,013,264 B2 | 3/2006 | Dolan |
| 7,031,908 B1 | 4/2006 | Huang |
| 7,050,964 B2 | 5/2006 | Menzes |
| 7,089,493 B2 | 8/2006 | Hatori et al. |
| 7,124,092 B2 | 10/2006 | O'toole, Jr. et al. |
| 7,177,792 B2 | 2/2007 | Knight |
| 7,191,447 B1 | 3/2007 | Ellis et al. |
| 7,207,005 B2 | 4/2007 | Laktritz |
| 7,209,875 B2 | 4/2007 | Quirk |
| 7,219,123 B1 | 5/2007 | Fiechter et al. |
| 7,242,988 B1* | 7/2007 | Hoffberg ............ G05B 19/0426 348/E5.102 |
| 7,249,013 B2 | 7/2007 | Al-Onaizan |
| 7,272,639 B1 | 9/2007 | Levergood et al. |
| 7,295,962 B2 | 11/2007 | Marcu |
| 7,295,963 B2 | 11/2007 | Richardson et al. |
| 7,333,927 B2 | 2/2008 | Lee |
| 7,340,388 B2 | 3/2008 | Soricut |
| 7,353,165 B2 | 4/2008 | Zhou |
| 7,369,984 B2 | 5/2008 | Fairweather |
| 7,389,222 B1 | 6/2008 | Langmead |
| 7,389,223 B2 | 6/2008 | Atkin |
| 7,448,040 B2 | 11/2008 | Ellis et al. |
| 7,454,326 B2 | 11/2008 | Marcu |
| 7,509,313 B2 | 3/2009 | Colledge |
| 7,516,062 B2 | 4/2009 | Chen et al. |
| 7,533,013 B2 | 5/2009 | Marcu |
| 7,620,538 B2 | 11/2009 | Marcu |
| 7,620,549 B2 | 11/2009 | Di Cristo |
| 7,624,005 B2 | 11/2009 | Koehn |
| 7,668,782 B1 | 2/2010 | Reistad et al. |
| 7,680,647 B2 | 3/2010 | Moore |
| 7,716,037 B2 | 5/2010 | Precoda |
| 7,734,459 B2 | 6/2010 | Menezes |
| 7,739,102 B2 | 6/2010 | Bender |
| 7,739,286 B2 | 6/2010 | Sethy |
| 7,788,087 B2 | 8/2010 | Corston-Oliver |
| 7,813,918 B2 | 10/2010 | Muslea |
| 7,817,251 B2 | 10/2010 | Kimura |
| 7,865,358 B2 | 1/2011 | Green |
| 7,877,251 B2 | 1/2011 | Kumaran et al. |
| 7,925,493 B2 | 4/2011 | Watanabe |
| 7,945,437 B2 | 5/2011 | Mount et al. |
| 7,983,896 B2 | 7/2011 | Ross |
| 7,983,897 B2 | 7/2011 | Chin |
| 8,078,450 B2 | 12/2011 | Anisimovich et al. |
| 8,135,575 B1 | 3/2012 | Dean |
| 8,195,447 B2 | 6/2012 | Anismovich |
| 8,214,196 B2 | 7/2012 | Yamada |
| 8,239,186 B2 | 8/2012 | Chin |
| 8,239,207 B2 | 8/2012 | Seligman |
| 8,286,185 B2 | 10/2012 | Ellis et al. |
| 8,296,127 B2 | 10/2012 | Marcu |
| 8,352,244 B2 | 1/2013 | Gao et al. |
| 8,364,463 B2 | 1/2013 | Miyamoto |
| 8,386,234 B2 | 2/2013 | Uchimoto et al. |
| 8,423,346 B2 | 4/2013 | Seo et al. |
| 8,442,812 B2 | 5/2013 | Ehsani |
| 8,521,506 B2 | 8/2013 | Lancaster et al. |
| 8,527,260 B2 | 9/2013 | Best |
| 8,548,794 B2 | 10/2013 | Koehn |
| 8,548,995 B1 | 10/2013 | Curtiss |
| 8,554,591 B2 | 10/2013 | Reistad et al. |
| 8,594,992 B2 | 11/2013 | Kuhn et al. |
| 8,600,728 B2 | 12/2013 | Knight |
| 8,606,900 B1 | 12/2013 | Levergood et al. |
| 8,612,203 B2 | 12/2013 | Foster |
| 8,615,388 B2 | 12/2013 | Li |
| 8,635,327 B1 | 1/2014 | Levergood et al. |
| 8,635,539 B2 | 1/2014 | Young |
| 8,666,725 B2 | 3/2014 | Och |
| 8,676,563 B2 | 3/2014 | Soricut et al. |
| 8,688,454 B2 | 4/2014 | Zheng |
| 8,725,496 B2 | 5/2014 | Zhao |
| 8,768,686 B2 | 7/2014 | Sarikaya et al. |
| 8,775,154 B2 | 7/2014 | Clinchant |
| 8,818,790 B2 | 8/2014 | He et al. |
| 8,843,359 B2 | 9/2014 | Lauder |
| 8,843,482 B2* | 9/2014 | Buriano ............ G06F 17/30035 707/732 |
| 8,862,456 B2 | 10/2014 | Krack et al. |
| 8,886,517 B2 | 11/2014 | Soricut et al. |
| 8,898,052 B2 | 11/2014 | Waibel |
| 8,903,707 B2 | 12/2014 | Zhao |
| 8,930,176 B2 | 1/2015 | Li |
| 8,935,148 B2 | 1/2015 | Christ |
| 8,935,149 B2 | 1/2015 | Zhang |
| 8,935,150 B2 | 1/2015 | Christ |
| 8,935,706 B2 | 1/2015 | Ellis et al. |
| 8,972,268 B2 | 3/2015 | Waibel |
| 9,026,425 B2 | 5/2015 | Nikoulina et al. |
| 9,053,202 B2 | 6/2015 | Viswanadha |
| 9,081,762 B2 | 7/2015 | Wu |
| 9,141,606 B2 | 9/2015 | Marciano |
| 9,176,952 B2 | 11/2015 | Aikawa |
| 9,183,192 B1 | 11/2015 | Ruby, Jr. |
| 9,183,198 B2 | 11/2015 | Shen et al. |
| 9,201,870 B2 | 12/2015 | Jurach |
| 9,208,144 B1 | 12/2015 | Abdulnasyrov |
| 9,208,509 B1* | 12/2015 | Curran ............... G06Q 30/0254 |
| 9,396,184 B2 | 7/2016 | Roy |
| 9,465,797 B2 | 10/2016 | Ji |
| 9,471,563 B2 | 10/2016 | Trese |
| 9,519,640 B2 | 12/2016 | Perez |
| 9,552,355 B2 | 1/2017 | Dymetman |
| 9,600,473 B2 | 3/2017 | Leydon |
| 9,613,026 B2 | 4/2017 | Hodson |
| 9,916,306 B2 | 3/2018 | van den Oever et al. |
| 9,984,054 B2 | 5/2018 | Trese et al. |
| 2001/0027460 A1* | 10/2001 | Yamamoto ............ G06F 17/218 715/229 |
| 2001/0029455 A1* | 10/2001 | Chin ..................... G06F 17/273 704/277 |
| 2002/0042790 A1* | 4/2002 | Nagahara .......... G06F 17/30899 |
| 2002/0046018 A1 | 4/2002 | Marcu |
| 2002/0083103 A1 | 6/2002 | Ballance |
| 2002/0124109 A1 | 9/2002 | Brown |
| 2002/0165724 A1 | 11/2002 | Blankesteijn |
| 2003/0009320 A1 | 1/2003 | Furuta |
| 2003/0040899 A1* | 2/2003 | Ogilvie ................. G06F 17/289 704/2 |
| 2003/0046056 A1* | 3/2003 | Godoy .................. G06F 17/289 704/1 |
| 2003/0200094 A1 | 10/2003 | Gupta |
| 2004/0006585 A1 | 1/2004 | Paulus et al. |
| 2004/0006744 A1 | 1/2004 | Jones et al. |
| 2004/0034520 A1 | 2/2004 | Langkilde-Geary |
| 2004/0044517 A1 | 3/2004 | Palmquist |
| 2004/0064552 A1* | 4/2004 | Chong et al. .................. 709/224 |
| 2004/0085354 A1 | 5/2004 | Massand |
| 2004/0088647 A1* | 5/2004 | Miller et al. .................. 715/500 |
| 2004/0167768 A1 | 8/2004 | Travieso et al. |
| 2004/0205656 A1 | 10/2004 | Reulein et al. |
| 2004/0255281 A1 | 12/2004 | Imamura et al. |

(56) References Cited

U.S. PATENT DOCUMENTS

| | | | |
|---|---|---|---|
| 2005/0055630 A1* | 3/2005 | Scanlan | G06F 17/289 715/234 |
| 2005/0171944 A1 | 8/2005 | Palmquist | |
| 2005/0177358 A1 | 8/2005 | Melomed et al. | |
| 2006/0031225 A1* | 2/2006 | Palmeri et al. | 707/10 |
| 2006/0095526 A1 | 5/2006 | Levergood et al. | |
| 2006/0155716 A1 | 7/2006 | Vasishth et al. | |
| 2006/0184410 A1* | 8/2006 | Ramamurthy et al. | 705/8 |
| 2006/0248084 A1 | 11/2006 | Sack et al. | |
| 2006/0282255 A1 | 12/2006 | Lu | |
| 2007/0043553 A1 | 2/2007 | Dolan | |
| 2007/0073544 A1 | 3/2007 | Millett et al. | |
| 2007/0106633 A1 | 5/2007 | Reiner | |
| 2007/0112553 A1 | 5/2007 | Jacobson | |
| 2007/0112851 A1 | 5/2007 | Tomic et al. | |
| 2007/0136065 A1 | 6/2007 | Chiu et al. | |
| 2007/0136284 A1 | 6/2007 | Cobb et al. | |
| 2007/0188657 A1 | 8/2007 | Basson et al. | |
| 2007/0198245 A1 | 8/2007 | Kamatani et al. | |
| 2007/0211071 A1 | 9/2007 | Slotznick et al. | |
| 2007/0220010 A1* | 9/2007 | Ertugrul | G06F 17/30867 |
| 2007/0294076 A1 | 12/2007 | Shore et al. | |
| 2007/0294080 A1 | 12/2007 | Bangalore | |
| 2008/0005670 A1 | 1/2008 | Pravetz et al. | |
| 2008/0040635 A1 | 2/2008 | Larcheveque et al. | |
| 2008/0077391 A1 | 3/2008 | Chino et al. | |
| 2008/0077392 A1 | 3/2008 | Kamatani et al. | |
| 2008/0086298 A1 | 4/2008 | Anismovich | |
| 2008/0088437 A1 | 4/2008 | Aninye et al. | |
| 2008/0102433 A1* | 5/2008 | Rogers et al. | 434/350 |
| 2008/0109374 A1 | 5/2008 | Levergood et al. | |
| 2008/0133245 A1 | 6/2008 | Proulx et al. | |
| 2008/0134018 A1* | 6/2008 | Kembel et al. | 715/234 |
| 2008/0154577 A1 | 6/2008 | Kim | |
| 2008/0159495 A1 | 7/2008 | Dahan | |
| 2008/0183758 A1 | 7/2008 | Kennedy | |
| 2008/0195372 A1 | 8/2008 | Chin et al. | |
| 2008/0201344 A1 | 8/2008 | Levergood et al. | |
| 2008/0254430 A1* | 10/2008 | Woolf et al. | 434/322 |
| 2008/0254433 A1* | 10/2008 | Woolf et al. | 434/332 |
| 2008/0270142 A1 | 10/2008 | Srinivasan et al. | |
| 2008/0288240 A1 | 11/2008 | D'Agostini | |
| 2009/0013162 A1 | 1/2009 | Nandan et al. | |
| 2009/0024595 A1* | 1/2009 | Chen | G06F 17/30864 |
| 2009/0048821 A1 | 2/2009 | Yam et al. | |
| 2009/0094017 A1 | 4/2009 | Chen et al. | |
| 2009/0217196 A1 | 8/2009 | Neff et al. | |
| 2009/0222257 A1 | 9/2009 | Sumita et al. | |
| 2009/0240539 A1 | 9/2009 | Slawson | |
| 2009/0271283 A1* | 10/2009 | Fosnacht | G06Q 20/123 705/26.1 |
| 2009/0313005 A1 | 12/2009 | Jaquinta | |
| 2009/0327294 A1 | 12/2009 | Bailor et al. | |
| 2010/0057439 A1 | 3/2010 | Ideuchi et al. | |
| 2010/0057561 A1 | 3/2010 | Gifford | |
| 2010/0115284 A1 | 5/2010 | Hahn et al. | |
| 2010/0121630 A1 | 5/2010 | Mende et al. | |
| 2010/0161643 A1* | 6/2010 | Gionis | G06F 17/30448 707/765 |
| 2010/0179803 A1 | 7/2010 | Sawaf | |
| 2010/0185648 A1 | 7/2010 | Chauhan et al. | |
| 2010/0257457 A1 | 10/2010 | De Goes | |
| 2011/0029300 A1 | 2/2011 | Marcu et al. | |
| 2011/0066469 A1 | 3/2011 | Kadosh | |
| 2011/0077933 A1 | 3/2011 | Miyamoto et al. | |
| 2011/0082683 A1 | 4/2011 | Soricut et al. | |
| 2011/0082684 A1 | 4/2011 | Soricut et al. | |
| 2011/0087680 A1 | 4/2011 | Murdock et al. | |
| 2011/0097693 A1 | 4/2011 | Crawford | |
| 2011/0137636 A1 | 6/2011 | Srihari et al. | |
| 2011/0184722 A1 | 7/2011 | Sneddon et al. | |
| 2011/0209047 A1* | 8/2011 | Olsen | G06F 9/4448 715/234 |
| 2011/0225104 A1 | 9/2011 | Soricut et al. | |
| 2011/0282648 A1* | 11/2011 | Sarikaya | G06F 17/2818 704/7 |
| 2012/0005156 A1 | 1/2012 | Grant et al. | |
| 2012/0022852 A1 | 1/2012 | Tregaskis | |
| 2012/0078609 A1 | 3/2012 | Chaturvedi et al. | |
| 2012/0221319 A1 | 8/2012 | Trese | |
| 2012/0271828 A1* | 10/2012 | Raghunath | G06F 17/2818 707/739 |
| 2012/0296914 A1* | 11/2012 | Romanov | G11B 27/034 707/741 |
| 2012/0330990 A1 | 12/2012 | Chen et al. | |
| 2013/0055074 A1 | 2/2013 | Trese et al. | |
| 2013/0144605 A1 | 6/2013 | Brager et al. | |
| 2013/0173247 A1 | 7/2013 | Hodson | |
| 2013/0325442 A1 | 12/2013 | Dahlmeier | |
| 2013/0325833 A1* | 12/2013 | Guan | G06F 17/30867 707/706 |
| 2014/0058718 A1 | 2/2014 | Kunchukuttan | |
| 2014/0114642 A1 | 4/2014 | van den Oever et al. | |
| 2014/0142917 A1 | 5/2014 | D'Penha | |
| 2014/0142918 A1 | 5/2014 | Dotterer | |
| 2014/0229257 A1 | 8/2014 | Reistad et al. | |
| 2014/0289702 A1 | 9/2014 | McMahon et al. | |
| 2014/0297252 A1 | 10/2014 | Prasad et al. | |
| 2014/0358519 A1 | 12/2014 | Mirkin | |
| 2014/0358524 A1 | 12/2014 | Papula | |
| 2014/0365201 A1 | 12/2014 | Gao | |
| 2015/0051896 A1 | 2/2015 | Simard | |
| 2015/0154180 A1 | 6/2015 | Trese | |
| 2015/0186362 A1 | 7/2015 | Li | |
| 2018/0217967 A1 | 8/2018 | Trese et al. | |

FOREIGN PATENT DOCUMENTS

| | | |
|---|---|---|
| AU | 5202299 A | 10/1999 |
| CA | 2221506 A1 | 12/1996 |
| CN | 102193914 A | 9/2011 |
| CN | 102662935 A | 9/2012 |
| CN | 102902667 A | 1/2013 |
| DE | 69525374 T2 | 8/2002 |
| DE | 69431306 T2 | 5/2003 |
| DE | 69633564 T2 | 11/2005 |
| EP | 0803103 A1 | 10/1997 |
| EP | 0830774 A2 | 3/1998 |
| EP | 1128301 A2 | 8/2001 |
| EP | 1128302 A2 | 8/2001 |
| EP | 1128303 A2 | 8/2001 |
| EP | 1235177 A2 | 8/2002 |
| EP | 0734556 B1 | 9/2002 |
| EP | 0830774 B1 | 10/2004 |
| EP | 1489523 A2 | 12/2004 |
| EP | 2299369 A1 | 3/2011 |
| EP | 2909742 A2 | 8/2015 |
| GB | 2241359 A | 8/1991 |
| JP | H10509543 A | 9/1998 |
| JP | H11507752 A | 7/1999 |
| JP | 3190881 B2 | 7/2001 |
| JP | 3190882 B2 | 7/2001 |
| JP | 3762882 B2 | 7/2001 |
| JP | 3260693 B2 | 2/2002 |
| JP | 3367675 B2 | 1/2003 |
| JP | 2003157402 A | 5/2003 |
| JP | 2006216073 A | 8/2006 |
| JP | 2007042127 A | 2/2007 |
| JP | 2008026971 A | 2/2008 |
| JP | 4485548 B2 | 6/2010 |
| JP | 4669373 B2 | 4/2011 |
| JP | 4669430 B2 | 4/2011 |
| WO | WO9516971 A1 | 6/1995 |
| WO | WO9613013 A1 | 5/1996 |
| WO | WO9642041 A2 | 12/1996 |
| WO | WO9715885 A1 | 5/1997 |
| WO | WO9819224 A2 | 5/1998 |
| WO | WO9952626 A1 | 10/1999 |
| WO | WO2002039318 A1 | 5/2002 |
| WO | WO2007068123 A1 | 6/2007 |
| WO | WO2010062540 A1 | 6/2010 |
| WO | WO2010062542 A1 | 6/2010 |

(56) References Cited

FOREIGN PATENT DOCUMENTS

| WO | WO 2012/118764 | 9/2012 |
|---|---|---|
| WO | WO 2012/118765 | 9/2012 |
| WO | WO 2013/028322 | 2/2013 |
| WO | WO 2014/060549 | 4/2014 |

OTHER PUBLICATIONS

Pun et al., "Audit Trail Analysis for Traffic Intensive Web Application", 2009, IEEE.*
Akkus et al., "Non-Tracking Web Analytics", Oct. 18, 2012, ACM.*
M. Pusara, "An Examination of User Behavior for Re-Authentication", Aug. 2007, Center for Education and Research in Information Assurance and Security, Purdue University.*
"W3C I18n Tutorial: Declaring Language in XHTML and HTML", Oct. 27, 2010, www.w3.org/International/tutorials/language-decl.*
Ceylan et al., "Language Identification of Search Engine Queries", 2009, Association for Computational Linguistics and Asian Federation of Natural Language Processing (ACL and AFNLP).*
Jones et al., "Beyond the Session Timeout: Automatic Hierarchical Segmentation of Search Topics in Query Logs", 2008, ACM.*
Ghorab et al., "A Framework for Cross-Language Search Personalizaiton", 2009, IEEE.*
International Search Report and Written Opinion dated May 31, 2012, re International Application No. PCT/US2012/026815 filed Feb. 27, 2012.
Final, dated Jun. 17, 2013, U.S. Appl. No. 13/037,262, filed Feb. 28, 2011.
Non-Final, dated Nov. 13, 2012, U.S. Appl. No. 13/037,262, filed Feb. 28, 2011.
Non-Final, dated Dec. 17, 2012, U.S. Appl. No. 13/217,122, filed Aug. 24, 2011.
International Search Report and Written Opinion dated Jun. 22, 2012, re International Application No. PCT/US2012/026814 filed Feb. 27, 2012.
Invitation to Pay Additional Fees dated Mar. 26, 2014, re International Application No. PCT/EP2013/071781 filed Oct. 17, 2013.
Bernth et al., "The Effect of Source Analysis on Translation Confidence", In: "Envisioning Machine Translation in the Information Future", Jan. 1, 2000, p. 89-99.
Uchimoto et al., "Automatic Rating of Machine Translatability", 10th Machine Translation Summit (MT Summit X), Sep. 12, 2005, p. 235-242.
Underwood et al., "Translatability Checker: A Tool to Help Decide Whether to Use MT", Proceedings of MT Summit VIII: Machine Translation in the Information Age., Jul. 18, 2001, p. 1-4.
Choumane et al., "Integrating translation services within a structured editor", Proceedings of the 2005 ACM Symposium on Document Engineering, DocEng '05, Nov. 2, 2005, p. 165-167.
Venkatapathy et al., "An SMT-driven Authoring Tool", Proceedings of COLING 2012: Demonstration Papers COLING 2012, Dec. 8, 2012, pp. 459-466.
Final Office Action, dated Oct. 9, 2013, U.S. Appl. No. 13/217,122, filed Aug. 24, 2011.
Office Action, dated Apr. 22, 2014, U.S. Appl. No. 13/656,543, filed Oct. 19, 2012.
International Search Report and Written Opinion dated Jul. 2, 2014 in Application No. PCT/EP2013/071781 filed Oct. 17, 2013.
International Search Report and Written Opinion dated Oct. 16, 2012 in Application No. PCT/US2012/049063 filed Jul. 31, 2012.
Non-Final Office Action, dated Feb. 25, 2016, U.S. Appl. No. 13/656,543, filed Oct. 19, 2012.
Final Office Action, dated Apr. 4, 2016, U.S. Appl. No. 14/325,198, filed Jul. 7, 2014.
Final Office Action, dated Aug. 5, 2015, U.S. Appl. No. 13/217,122, filed Aug. 24, 2011.
Final Office Action, dated Jun. 30, 2015, U.S. Appl. No. 13/656,543, filed Oct. 19, 2012.

Non-Final Office Action, dated Sep. 2, 2015, U.S. Appl. No. 14/325,198, filed Jul. 7, 2014.
Notice of Allowance, dated Jul. 29, 2016, U.S. Appl. No. 14/325,198, filed Jul. 7, 2014.
Non-Final Office Action, dated Oct. 11, 2016, U.S. Appl. No. 13/217,122, filed Aug. 24, 2011.
Final Office Action, dated Nov. 8, 2016, U.S. Appl. No. 13/656,543, filed Oct. 19, 2012.
Final Office Action, dated Apr. 14, 2017, U.S. Appl. No. 13/217,122, filed Aug. 24, 2011.
Trese, Andrew, "Systems, Methods and Media for Translating Informational Content", U.S. Appl. No. 13/037,262, filed Feb. 28, 2011, 34 pages.
Ghorab, M. Rami et al., "A Framework for Cross-language Search Personalization", IEEE Computer Society, 2009 Fourth International Workshop on Semantic Media Adaptation and Personalization, Dec. 14-15, 2009, pp. 15-20.
"Best Practices—Knowledge Base," Lilt website [online], Mar. 6, 2017 [retrieved on Oct. 19, 2017], Retrieved from the Internet: <https://lilt.com/kb/security>, 1 pages.
"The Lexicon—Knowledge Base,"Lilt website [online], Jun. 7, 2017 [retrieved on Oct. 20, 2017], Retrieved from the Internet:<https://lilt.com/kb/translators/lexicon>, 4 pages.
"Simple Translation—Knowledge Base," Lilt website [online], Aug. 17, 2017 [retrieved on Oct. 20, 2017], Retrieved from the Internet:<https://lilt.com/kb/api/simple-translation>, 3 pages.
"Split and Merge—Knowledge Base," Lilt website [online], Oct. 14, 2016 [retrieved on Oct. 20, 2017], Retrieved from the Internet:<https://lilt.com/kb/translators/split-merge>, 4 pages.
"Lilt API _ API Reference," Lilt website [online], retrieved on Oct. 20, 2017, Retrieved from the Internet:<https://lilt.com/docs/api>, 53 pages.
"Automatic Translation Quality—Knowledge Base", Lilt website [online], Dec. 1, 2016, retrieved on Oct. 20, 2017, Retrieved from the Internet:<https://lilt.com/kb/evaluation/evaluate-mt>, 4 pages.
"Projects—Knowledge Base,"Lilt website [online], Jun. 7, 2017, retrieved on Oct. 20, 2017, Retrieved from the Internet: <https://lilt.com/kb/project-managers/projects>, 3 pages.
34 "Getting Started with lilt," Lilt website [online], May 30, 2017, retrieved on Oct. 20, 2017, Retrieved from the Internet: <https://lilt.com/kb/api/lilt-js>, 6 pages.
"Interactive Translation—Knowledge Base," Lilt website [online], Aug. 17, 2017, retrieved on Oct. 20, 2017, Retrieved from the Internet<https://lilt.com/kb/api/interactive-translation>, 2 pages.
Hildebrand et al., "Adaptation of the Translation Model for Statistical Machine Translation based on Information Retrieval," EAMT 2005 Conference Proceedings, May 2005, pp. 133-142. Retrieved from https://www.researchgate.net/publication/228634956_Adaptation_of_the_translation_model_for_statistical_machine_translation_based_on_information_retrieval.
Och et al., "The Alignment Template Approach to Statistical Machine Translation Machine Translation," Computational Linguistics, vol. 30. No. 4, Dec. 1, 2004, pp. 417-442 (39 pages with citations). Retrieved from http://dl.acm.org/citation.cfm?id=1105589.
Sethy et al., "Building Topic Specific Language Models FromWebData Using Competitive Models," Interspeech 2005—Eurospeech, 9th European Conference on Speech Communication and Technology, Lisbon, Portugal, Sep. 4-8, 2005, 4 pages. Retrieved from https://www.researchgate.net/publication/221490916_Building_topic_specific_language_models_from_webdata_using_competitive_models.
Dobrinkat, "Domain Adaptation in Statistical Machine Translation Systems via User Feedback," Master's Thesis, University of Helsinki, Nov. 25, 2008, 103 pages. Retrieved from http://users.ics.aalto.fi/mdobrink/online-papers/dobrinkat08mt.pdf.
Business Wire, "Language Weaver Introduces User-Managed Customization Tool," Oct. 25, 2005, 3 pages. Retrieved from http: ProQuest.
Winiwarter, W., "Learning Transfer Rules for Machine Translation from Parallel Corpora," Journal of Digital Information Management, vol. 6 No. 4, Aug. 2008, pp. 285-293. Retrieved from https://www.researchgate.net/publication/220608987_Learning_Transfer_Rules_for_Machine_Translation_from_Parallel_Corpora.

(56) References Cited

OTHER PUBLICATIONS

Potet et al., "Preliminary Experiments on Using Users' Post-Editions to Enhance a SMT System," Proceedings of the European Association for Machine Translation (EAMT), May 2011, pp. 161-168. Retreived from Retrieved at http://www.mt-archive.info/EAMT-2011-Potet.pdf.

Ortiz-Martinez et al., "An Interactive Machine Translation System with Online Learning" Proceedings of the ACL-HLT 2011 System Demonstrations, Jun. 21, 2011, pp. 68-73. Retrieved from http://www.aclweb.org/anthology/P11-4012.

Lopez-Salcedo et al.,"Online Learning of Log-Linear Weights in Interactive Machine Translation," Communications in Computer and Information Science, vol. 328, 2011, pp. 1-10. Retrieved from http://www.casmacat.eu/uploads/Main/iberspeech2.pdf.

Blanchon et al., "A Web Service Enabling Gradable Post-edition of Pre-translations Pro duced by Existing Translation Tools: Practical Use to Provide High quality Translation of an Online Encyclopedia" Jan. 2009, 9 pages. Retrieved from http://www.mt-archive.info/MTS-2009-Blanchon.pdf.

Levenberg et al."Stream-based Translation Models for Statistical Machine Translation" Human Language Technologies: The 2010 Annual Conference of the North American Chapter of the ACL, Dec. 31, 2010, pp. 394-402.

Lagarda et al. "Statistical Post-Editing of a Rule Based Machine Translation System" Proceedings of NAACL HLT 2009: Short Papers, Jun. 2009, pp. 217-220.

Ehara, "Rule Based Machine Translation Combined with Statistical Post Editor for Japanese to English Patent Translation," MT Summit XI, 2007, pp. 13-18.

Bechara et al. "Statistical Post-Editing for a Statistical MT System" Proceedings of the 13th Machine Translation Summit, 2011, pp. 308-315.

"Callison-Burch et al. "Proceedings of the Seventh Workshop on Statistical Machine Translation" [W12-3100] Proceedings of the Seventh Workshop on Statistical Machine Translation, Jun. 7, 2012, pp. 11-51. Retrieved from: http://aclanthology.info/volumes/proceedings-of-the-seventh-workshop-onstatistical-machine-translation".

"Langlois et al. "LORIA System for the WMT12 Quality Estimation Shared Task" [W12-3113] Proceedings of the Seventh Workshop on Statistical Machine Translation, Jun. 7, 2012, pp. 114-119. Retrieved from:http://aclanthology.info/volumes/proceedings-of-the-seventh-workshop-onstatistical-machine-translation".

"Getting Started—Knowledge Base," Lilt website [online], Apr. 11, 2017 [retrieved on Oct. 20, 2017], Retrieved from the Internet:<https://lilt.com/kb/translators/getting-started>, 2 pages.

Nepveu et al. "Adaptive Language and Translation Models for Interactive Machine Translation" Conference on Empirical Methods in Natural Language Processing, Jul. 25, 2004, 8 pages. Retrieved from: http://www.cs.jhu.edu/~yarowsky/sigdat.html.

Ortiz-Martinez et al. "Online Learning for Interactive Statistical Machine Translation" Human Language Technologies: The 2010 Annual Conference of the North American Chapter of the ACL, Jun. 10, 2010, pp. 546-554. Retrieved from: https://www.researchgate.net/publication/220817231_Online_Learning_for_Interactive_Statistical_Machine_Translation.

Lopez, Adam. "Putting Human Assessments of Machine Translation Systems in Order" [W12-3101] Proceedings of the Seventh Workshop on Statistical Machine Translation, Jun. 7, 2012, pp. 1-9. Retrieved from: http://aclanthology.info/volumes/proceedings-of-the-seventh-workshop-onstatistical-machine-translation Avramidis, Eleftherios. "Quality estimation for Machine Translation output using linguistic analysis and decoding features" [W12-3108] Proceedings of the Seventh Workshop on Statistical Machine Translation, Jun. 7, 2012, pp. 84-90. Retrieved from: http://aclanthology.info/volumes/proceedings-of-the-seventh-workshop-onstatistical-machine-translation.

Buck, Christian. "Black Box Features for the WMT 2012 Quality Estimation Shared Task" [W12-3109] Proceedings of the Seventh Workshop on Statistical Machine Translation, Jun. 7, 2012, pp. 91-95. Retrieved from: Proceedings of the Seventh Workshop on Statistical Machine Translation. Retrieved from: http://aclanthology.info/volumes/proceedings-of-the-seventh-workshop-onstatistical-machine-translation.

Felice et al. "Linguistic Features for Quality Estimation" [W12-3110] Proceedings of the Seventh Workshop on Statistical Machine Translation, Jun. 7, 2012, pp. 96-103. Retrieved at: http://aclanthology.info/volumes/proceedings-of-the-seventh-workshop-onstatistical-machine-translation.

Gonzalez-Rubio et al. "PRHLT Submission to the WMT12 Quality Estimation Task" [W12-3111] Proceedings of the Seventh Workshop on Statistical Machine Translation, Jun. 7, 2012, pp. 104-108. Retrieved from: http://aclanthology.info/volumes/proceedings-of-the-seventh-workshop-onstatistical-machine-translation.

Hardmeier et al. "Tree Kernels for Machine Translation Quality Estimation" [W12- 3112] Proceedings of the Seventh Workshop on Statistical Machine Translation, Jun. 7, 2012, pp. 109-113. Retrieved from: http://aclanthology.info/volumes/proceedings-of-the-seventh-workshop-onstatistical-machine-translation.

Moreau et al. "Quality Estimation: an experimental study using unsupervised similarity measures" [W12-3114] Proceedings of the Seventh Workshop on Statistical Machine Translation, Jun. 7, 2012, pp. 120-126. Retrieved from: http://aclanthology.info/volumes/proceedings-of-the-seventh-workshop-onstatistical-machine-translation.

Gonzalez et al. "The UPC Submission to the WMT 2012 Shared Task on Quality Estimation" [W12-3115] Proceedings of the Seventh Workshop on Statistical Machine Translation, Jun. 7, 2012, pp. 127-132. Retrieved from: http://aclanthology.info/volumes/proceedings-of-the-seventh-workshop-onstatistical-machine-translation.

Popovic, Maja. "Morpheme- and POS-based IBM1 and language model scores for translation quality estimation" Proceedings of the Seventh Workshop on Statistical Machine Translation, Jun. 7, 2012, pp. 133-137. Retrieved from: http://aclanthology.info/volumes/proceedings-of-the-seventh-workshop-onstatistical-machine-translation.

Rubino et al. "DCU-Symantec Submission for the WMT 2012 Quality Estimation Task" [W12-3117] Proceedings of the Seventh Workshop on Statistical Machine Translation, Jun. 7, 2012, pp. 138-144. Retrieved from: http://aclanthology.info/volumes/proceedings-of-the-seventh-workshop-onstatistical-machine-translation.

Soricut et al. "The SDL Language Weaver Systems in the WMT12 Quality Estimation Shared Task" [W12-3118] Proceedings of the Seventh Workshop on Statistical Machine Translation, Jun. 7, 2012, pp. 145-151. Retrieved from: http://aclanthology.info/volumes/proceedings-of-the-seventh-workshop-onstatistical-machine-translation.

Wu et al. "Regression with Phrase Indicators for Estimating MT Quality" [W12- 3119] Proceedings of the Seventh Workshop on Statistical Machine Translation, Jun. 7, 2012, pp. 152-156. Retrieved from: http://aclanthology.info/volumes/proceedings-of-the-seventh-workshop-onstatistical-machine-translation.

Wuebker et al. "Hierarchical Incremental Adaptation for Statistical Machine Translation" Proceedings of the 2015 Conference on Empirical Methods in Natural Language Processing, pp. 1059-1065, Lisbon, Portugal, Sep. 17-21, 2015.

"Best Practices—Knowledge Base," Lilt website [online], Mar. 6, 2017 [retrieved on Oct. 19, 2017], Retrieved from the Internet:<https://lilt.com/kb/translators/best-practices>, 2 pages.

"Data Security—Knowledge Base," Lilt website [online], Oct. 14, 2016 [retrieved on Oct. 19, 2017], Retrieved from the Internet:<https://lilt.com/kb/security>, 1 pages.

"Data Security and Confidentiality," Lilt website [online], 2017 [retrieved on Oct. 19, 2017], Retrieved from the Internet: <https://lilt.com/security>, 7 pages.

"Memories—Knowledge Base," Lilt website [online], Jun. 7, 2017 [retrieved on Oct. 19, 2017], Retrieved from the Internet:<https://lilt.com/kb/project-managers/memory>, 4 pages.

"Memories (API)—Knowledge Base," Lilt website [online], Jun. 2, 2017 [retrieved on Oct. 19, 2017], Retrieved from the Internet:<https://lilt.com/kb/api/memories>, 1 page.

(56) References Cited

OTHER PUBLICATIONS

"Quoting—Knowledge Base," Lilt website [online], Jun. 7, 2017 [retrieved on Oct. 19, 2017], Retrieved from the Internet:<https://lilt.com/kb/project-managers/quoting>, 4 pages.

"The Editor—Knowledge Base," Lilt website [online], Aug. 15, 2017 [retrieved on Oct. 19, 2017], Retrieved from the Internet:<https://lilt.com/kb/translators/editor>, 5 pages.

"Training Lilt—Knowledge Base," Lilt website [online], Oct. 14, 2016 [retrieved on Oct. 20, 2017], Retrieved from the Internet:<https://lilt.com/kb/troubleshooting/training-lilt>, 1 page.

"What is Lilt_—Knowledge Base," Lilt website [online], Dec. 15, 2016 [retrieved on Oct. 19, 2017], Retrieved from the Internet:<https://lilt.com/kb/what-is-lilt>, 1 page.

"The Lexicon—Knowledge Base," Lilt website [online], Jun. 7, 2017 [retrieved on Oct. 20, 2017], Retrieved from the Internet:<https://lift.com/kb/translators/lexicon>, 4 pages.

\* cited by examiner

SYSTEMS, METHODS, AND MEDIA FOR GENERATING ANALYTICAL DATA

CROSS-REFERENCE TO RELATED APPLICATION

This application is related to concurrently filed U.S. patent application Ser. No. 13/037,262, filed on Feb. 28, 2011 and titled "SYSTEMS, METHODS AND MEDIA FOR TRANSLATING INFORMATIONAL CONTENT." The disclosure of the aforementioned application is incorporated herein by reference.

FIELD OF THE INVENTION

The present technology relates generally to generating analytical data, and more specifically, but not by way of limitation, to systems, methods, and media for generating analytical data and utilizing the generated analytical data to dynamically generate informational content.

SUMMARY OF THE INVENTION

According to some embodiments, the present technology is directed to methods for generating analytical data. The methods may include: (a) capturing one or more audit trails by determining actions performed on one or more publishing servers via one or more client devices, one or more publishing servers adapted to publish informational content; (b) generating analytical data from the one or more audit trails; and (c) storing the generated analytical data in a database.

In additional embodiments, the present technology may include systems for generating analytical data that include: (a) a memory for storing executable instructions for generating analytical data; and (b) a processor configured to execute the instructions stored in the memory to: (i) capture one or more audit trails by determining actions performed on one or more publishing servers via one or more client devices, one or more publishing servers adapted to publish informational content; (ii) evaluate the one or more audit trails to generate analytical data from the one or more audit trails; and (iii) store the generated analytical data in a database.

Additional embodiments include non-transitory computer readable storage mediums having a computer program embodied thereon. The computer program is executable by a processor in a computing system to perform a method for generating analytical data. The method may include: (a) capturing one or more audit trails by determining actions performed on one or more publishing servers via one or more client devices, one or more publishing servers adapted to publish informational content; (b) generating analytical data from the one or more audit trails; and (c) storing the generated analytical data in a database.

In additional embodiments, the present technology may include methods for dynamically generating informational content from analytical data that include: (a) capturing one or more audit trails by determining actions performed on one or more publishing servers via one or more client devices, one or more publishing servers adapted to publish informational content; (b) generating analytical data from the one or more audit trails; (c) comparing the analytical data to informational content in the database; and (d) dynamically generating informational content that corresponds to at least a portion of the analytical data.

DETAILED DESCRIPTION OF EXEMPLARY EMBODIMENTS

Figure 1:
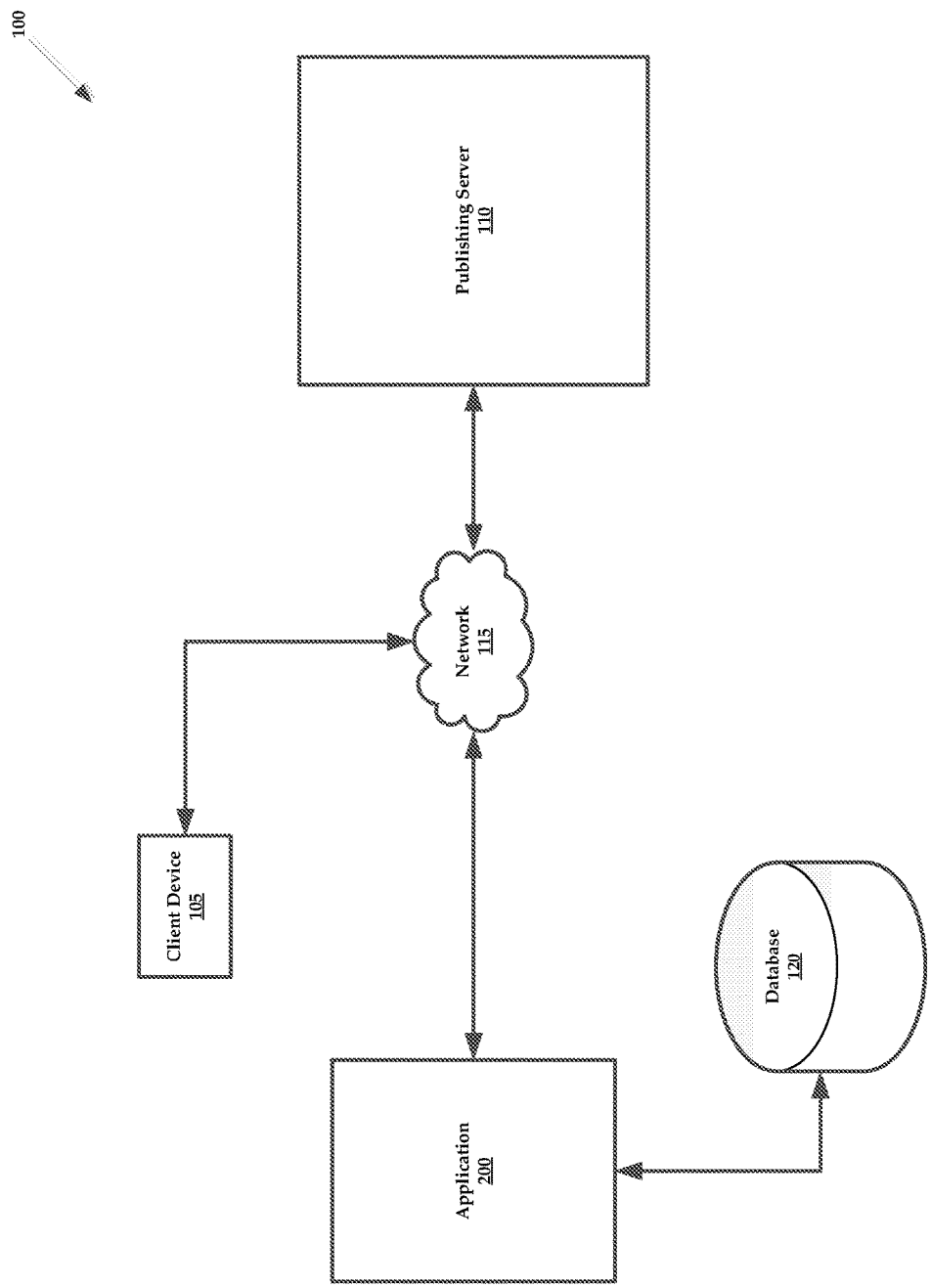
FIG. 1 is a schematic diagram of an exemplary architecture of a system utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Information developers, who create and distribute informational content via multiple channels, and utilizing multiple languages, may desire an understanding of how such informational content is being utilized by end users. Information developers may also desire to understand the relative value of informational content to the preferences of end users. As such, the systems and methods provided herein may be adapted to generate analytical data from actions performed on one or more publishing servers.

It is noteworthy that the term "channel" may be understood to include RSS and news feeds, web content aggregators, web engines, one or more web pages, social networking medias, search engines, online ad engines, banner engines, online news groups, forums, web applications (both standard and mobile), any combinations thereof, or the like. It will be understood that informational content may include any of a document, a web page, an interactive object, a media file, a hotspot, an extensible markup language cross-reference, combinations thereof, etc.

Systems and methods according to the present technology may be adapted to simultaneously bring analytical data closer to the underlying informational content and closer to the actions performed by an end user as they utilize and/or navigate the informational content. For example, information developers may utilize the systems and methods of the present technology to selectively modify informational content that is hosted via a publishing server. The information developers may base their modifications of informational content upon keywords utilized by end users to search for technical manuals, for example, on the publishing server. Stated otherwise, systems and methods provided herein may be adapted to provide information developers with analytical data that allows the information developers to fashion informational content that is more useful to end users. As such, information developers may learn how to speak the language of their customers (e.g., end users). Further, by tracking how information is used, information developers will also understand which products are successful, and which are not. This ties back into product management, but also into marketing as it shows opportunities for new marketing initiatives.

Additionally, systems and methods provided herein may be adapted to enable managed processes that prevent the generation of conflicting informational content and accelerate the delivery of informational content through automated processes. Moreover, the systems and methods may allow end users to save time locating informational content by way of a fully searchable, easy-to-use viewing interface that enables the delivery of informational content that includes but is not limited to text, graphics, audio, and video to make concepts easy to understand.

Some of the functionalities of the systems and methods according to the present technology may be based upon an empirical evaluation of the underlying informational content that end users are utilizing. By better understanding actions performed by the end users, and by being able to directly correlate the outcomes (e.g., success, failure, bounce rates, and so forth) to the underlying informational content, systems and methods provided herein may be utilized to create and target informational content that more closely corresponds to the preferences of end users. These types of analytical data may drive direct changes, additions, or reductions to the informational content managed by information developers.

Additionally, the systems and methods may be adapted to dynamically generate informational content on-the-fly utilizing the analytical data corresponding to end user interactions with a publication server that is utilized to provide informational content.

Generally speaking, the systems and methods provided herein may be adapted to generate analytical data from end user actions performed on a publishing server. The actions performed on the publishing server may be received from one or more client devices communicatively coupled with the publishing server. The analytical data may be utilized to generate informational content that more closely corresponds to the preferences of end users. The preferences of end users may be determined by evaluating actions performed on a publishing server by client devices associated with the end users.

Rather than merely capturing broad analytical data such as page hits, page loads, and so forth, systems and methods according to the present technology may be adapted to utilize both traditional generic analytical data along with content rich analytical data. Systems and methods according to the present technology may be adapted to determine analytical data from content rich audit trails that are captured during end user sessions. A session typically includes one or more actions performed on a publishing server by a client device. Additionally, analytical data may also include device configuration information, user profile information, language preferences, end user skill level, actions performed on a publishing server, and other conditions. In additional embodiments, analytical data may be directly gathered from end user feedback via forms and other feedback methods.

Systems and methods described herein may utilize these content rich audit trails as a basis for filtering and formatting informational content on-the-fly. Rather than providing end users with static informational content, the systems and methods provided herein may be adapted to provide end users with highly relevant informational content that is dynamically modified based upon the preferences and behaviors of the end user.

According to some embodiments, systems and methods provided herein may be adapted to create or modify informational content based upon the languages utilized by end users or by language information associated with informational content frequently accessed on a publishing server. These and other functional and implementational details regarding systems and methods according to the present technology are described in greater detail herein.

Referring to FIG. 1, a schematic diagram of an exemplary architecture 100 for practicing aspects according to the present technology is depicted. Generally speaking, the architecture may include a plurality of client devices 105 (shown herein as a single client device 105) that are communicatively coupled with one or more publishing servers 110 (shown herein as a single publishing server 110) via a network 115. The network 115 may include any one of a number of different communication channels, and in some embodiments may include the Internet.

The client device 105 may include any general purpose computing system that may implement a web browser application or other suitable applications adapted to request and provide information (such as web content) to and from a web server, such as publishing server 110. A suitable client device 105 may include, for example, the computing system 400 disclosed with reference to FIG. 4. Additionally, the publishing server 110 and the database 120 may also include many of the components of computing system 400, although exemplary implementational and structural details regarding the publishing servers 110 will be provided below.

As stated above, the publishing server 110 may be adapted to generate analytical data and utilize the generated analytical data to dynamically generate informational content. For example, the publishing server 110 may be adapted to generate analytical data from actions performed on one or more publishing servers 110 by one or more client devices 105.

According to some embodiments, the publishing server 110 may be adapted to utilize previously generated analytical data for the end user (based upon the client device associated with the end user) along with current device configuration information, and any other content rich analytical data to select, on-the-fly, informational content that corresponds to preferences of the end user.

According to some embodiments, the publishing server 110 may be communicatively connected to a database 120 that is utilized by information developers to store informational content. In some embodiments, the database 120 includes an extensible markup language (XML) database. Informational content generated by the information developers may be stored in the XML database in a native XML format until requested by end users. Upon request, the publishing server 110 may locate informational content that corresponds to preferences of the end user and utilize the preferences of the end user to generate informational content that corresponds to the preferences. It will be understood that the database 120 may utilize the Darwin Information Typing Architecture (DITA) for authoring, producing, and delivering information, although one of ordinary skill in the art will appreciate that other types of information architectures may likewise be utilized in accordance with embodiments according to the present technology.

It will be understood that because the database 120 utilizes DITA architecture in some embodiments, the publishing server 110 may be able to generate informational content in a variety of exemplary formats such as portable document format (PDF) documents via extensible stylesheet language formatting objects (XSL-FO), extensible hypertext markup language, rich text format, and a plurality of application specific informational content formats (e.g., eclipse, java, oracle, and so forth.)

Figure 2:
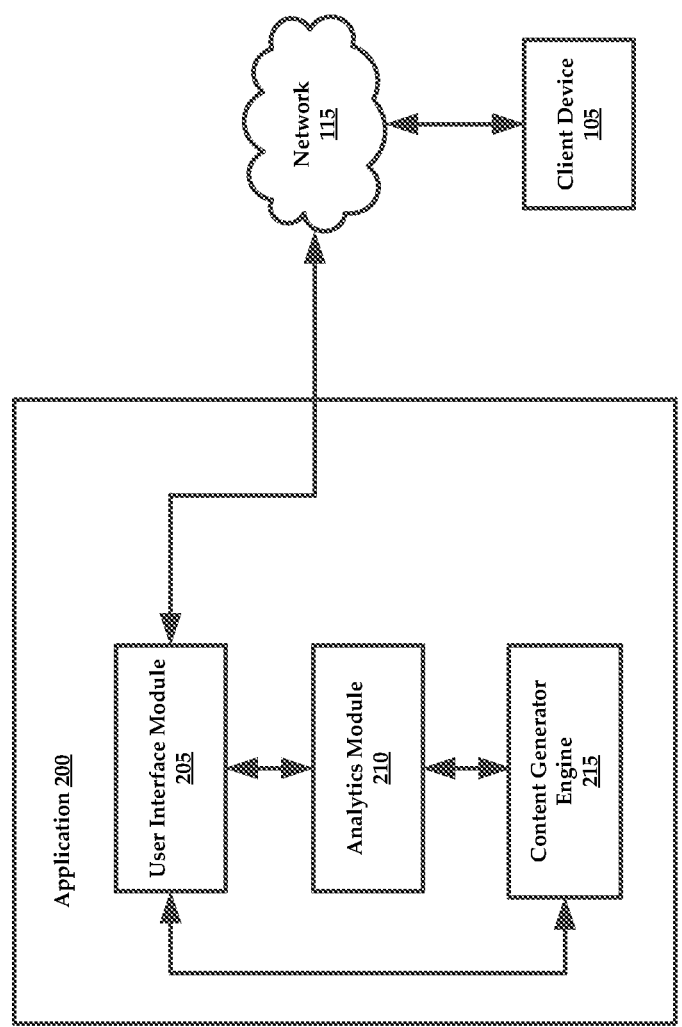
FIG. 2 illustrates an application associated with a publishing server.

Referring now to FIGS. 1 and 2 collectively, the publishing server 110 may be described as a particular purpose computing system that includes executable instructions that, when executed by the processor of the publishing server 110, cause the publishing server 110 to generate analytical data from actions performed on a publishing server 110 by one or more client devices 105. Generally speaking, the analytical data may also include any of device configuration information, user profile information, language preferences, end user skill level, actions performed on a publishing server, product purchase data, geo-location data, and other conditions.

While the executable instructions resident on the publishing server 110 may include any number of modules, engines, applications, functions, and so forth, for the purposes of clarity, the executable instructions may be generally described as an application 200 having one or more modules.

Generally, the application 200 may include a user interface module 205, an analytics module 210, and a content generator engine 215. It will be understood that the application 200 may include fewer or more modules and/or engines and still fall within the scope of the present technology.

In some embodiments, (such as in FIG. 1) the application 200 may include a standalone application executable on a client device 105. The application 200 may interact with the publishing server 110 and database 120. In additional embodiments, the application 200 may interface with targeting engines (not shown) of online marketing systems. In some exemplary embodiments, (such as in FIG. 2) the application 200 may include a web-based application residing on the publishing server 110 (or residing on another computing device that is communicatively coupled with the publishing server 110) that may be accessible via a web browser application resident on a client device 105.

The user interface module 205 may be adapted to generate graphical user interfaces that allow end users to interact with the application 200 to, for example, search for and retrieve informational content. The user interface module 205 may be adapted to provide informational content in a visual format that is perceivable by the end users.

Although not shown, the user interface module 205 may generate a search interface adapted to receive search information from end users. It is envisioned that search information may include keywords, Boolean operators, search strings, natural language, functional operators (e.g., wildcard, truncation, and so forth), etc. In some embodiments, the publishing server 110 may be adapted to utilize a Lucene search index system, and/or extensible markup language query language (XQuery) that utilizes the content richness XML formatted data.

Upon a client device 105 accessing the application 200, the analytics module 210 may be executed by the processor of the publishing server 110 to gather information from the client device 105. It will be understood that the analytics module 210 may operate transparently relative to the end user of the client device 105.

In some embodiments, analytical data may be obtained from a user profile established by each end user. The application 200 may be adapted to allow end users to establish and modify a user profile that includes pertinent information regarding the end user. Some examples of the types of information include but are not limited to occupation, name, age, location, product interest, or any other suitable preferences.

In addition to user preferences gathered from a user profile, the analytics module 210 may be adapted to determine content rich analytical data by capturing audit trails from the client device 105. In some instances, each of a plurality of the audit trails corresponds to a session that is initiated by the client device 105 accessing the publishing server 110. One example includes an end user logging onto the application 200 via a login page generated by the user interface module 205.

The session may include the various actions performed by the client device 105 on the publishing server 110 between the initiation of the session and the termination of the session. It will be understood that the termination of the session may include the client device 105 terminating communication with the publishing server 110. For example, the end user may perform a logout event via the application 200.

Between the initiation and termination of the session, the analytics module 210 captures the various actions performed by the client device 105 on the publishing server 110. Non-limiting examples of actions performed include searching, resolving, opening, printing, viewing, visibility time, accessing, requesting, etc., of informational content published by the publishing server 110. One of ordinary skill in the art will appreciate that actions may also be determined from transitional web analytics gathered from the client device 105 such as bounce rates, session rates, click path, frequency, and so forth. Any other suitable actions may be performed in various embodiments.

It will be appreciated that publishing may include generating informational content by obtaining and arranging informational content in a format that may be displayed on a display device of a client device 105. Publishing may also include arranging and generating informational content in a binary format or other format that may be utilized by an application to display informational content in a format that is perceivable to an end user.

The analytics module 210 may be adapted to correlate actions performed on the publishing server 110 by associating the audit trail with a session key. The various actions performed by the client device 105 on the publishing server 110 during the session may be associated with the session key.

In additional embodiments, if an end user logs into the application 200 under a first username, and then subsequently logs into the application 200 utilizing a different username (but still utilizing the same client device 105), the session key may stay the same in order to facilitate tracking the actions of the end user. In such cases, the analytics module 210 may record the change in the audit trial. Therefore, the same audit trail may be utilized for recording new actions performed on the publishing server 110 under the new username.

Upon the termination of the session, the analytics module 210 may destroy the session key, closing the audit trail and providing notification of the termination event to the application 200. Likewise, if the end user times out (e.g., the application is not interacted with for a given period of time) and is logged out, the analytics module 210 may destroy the session key, closing the audit trail.

According to some embodiments, the analytics module 210 may be adapted to associate an audit trail with the publishing server 110 on which actions were performed by a client device 105 via a host key.

Rather than only correlating actions performed on the publishing server 110 by way of a session key, the analytics module 210 may group actions and results together as one or more transactions. That is, transactions may be subsets of actions within an audit trail that are correlated generally according to causes, results, and intervening actions. For example, if an end user performs a search request and then selects an informational document from a list of search results generated by the publishing server 110, the analytics module 210 may infer that the search request successfully caused end users to select particular informational content. In contrast, search results that do not result in a selection of informational content by end users may indicate that additional types of informational content should be created, or that end users are utilizing a different lexicon than the lexicon utilized by the content creators that establish the informational content.

In addition to search transactions, other common transaction types analyzed by the analytics module 210 may relate to the utilization of informational content such as documents, various types of media (e.g., interactive videos, interactive images, audio, and so forth), integration bridges (e.g., for web services, parts ordering, and so forth), and web forms—just to name a few. It will be understood that tracking the utilization of web forms may include providing the various web forms with a form key and an instance key.

In some embodiments, the analytics module 210 may be adapted to track transactions by way of a unique transaction key. All subsequent events in that transaction may be correlated to the transaction via the transaction key such that an entire stream of events may be correlated and later analyzed, either as individual events or as events relative to one another.

In other examples, the analytics module 210 may utilize keywords included in search requests to compare what end users are searching for with what informational content the end users are selecting. These types of empirical data allow information developers to include specific keywords in their informational content to increase the chances of end users selecting the type of informational content desired by the information developers. In addition to keywords, the analytics module 210 may also analyze search transactions associated with search requests to determine the number of search results obtained, the time it took for the publishing server 110 to generate the search result, and whether a full text search was utilized or only a categorical search.

With regard to tracking the utilization of informational content such as documents, the analytics module 210 may be adapted to process document transactions. For example, opening a document may cause the analytics module 210 to generate a transaction key. Subsequent actions relative to the document may be correlated to the opening of the document via the transaction key. Examples of subsequent actions may include printing the document and/or XML cross referencing (XREF) actions.

With regard to tracing the utilization of media, the analytics module 210 may be adapted to, for example, determine the occurrence of the opening of a media file. When a multimedia or image file is opened, a transaction key may be created by the analytics module 210 for the media file. Subsequent actions relative to the opening of the media file may include the creation of XREF events, which may be correlated to the media file via the transaction key.

Additionally, the analytics module 210 may be adapted to determine when a user clicks an XREF (or hotspot) on a web page. For example, if an end user clicks or activates an XREF, hotspot, animation, hyperlink (something active in the graphic that may be related to the graphic via identifying information such as metadata), or the like, this may cause the analytics module 210 to create a transaction key.

Additional transactions tracked and evaluated by the analytics module 210 may include client devices 105 utilizing animations. The analytics module 210 may be adapted to determine if the animation was played all the way through. The analytics module 210 may also be adapted to, for example, determine JavaScript events provided by an ActiveX or graphic plug-in associated with a web browser application.

Individual actions performed on the publishing server 110 may also be utilized by the analytics module 210 to infer usage data relative to informational content. For example, if a substantial majority of end users are accessing how-to manuals for relatively simple tasks such as establishing a user profile, it may be inferred that the mechanisms or processes by which end users establish user profiles are overly complex or non-intuitive. Therefore, system architects or content managers may utilize such information to better refine the mechanisms or processes by which end users establish user profiles.

The analytics module 210 may be adapted to gather device configuration information from the client device such as a media access control (MAC) address, an Internet protocol (IP) address, a web browser application type, a web browser application version, an operating system type, an operating system version, a hostname of the client device, session data associated with a cookie resident on the client device, etc., and combinations thereof.

Moreover, the analytics module 210 may generate analytical data from language preferences determined from actions performed by client devices 105 of publishing servers 110. For example, the analytics module 210 may determine language preferences by evaluating preferences from a web browser application of the client device 105 or from a user profile associated with the application 200. In additional examples, the analytics module 210 may determine language preferences from evaluating the languages of informational content accessed by client devices 105.

As such, the application 200 may infer that the language preference of an end user is, say, English based upon the fact that the client device 105 performs opening actions on English informational content only. The application 200 may also infer language preferences based upon data associated with geo-location information corresponding to the client device 105. Therefore, informational content provided to the client device 105 by the application 200 may be provided in English, either by selecting English informational content, or by translating informational content that corresponds to the preference of the end user that was created in additional languages. It will be understood that if the end user changes language preferences, that change (or changes) to language preference(s) may be recorded and associated with the particular end user via their profile.

In addition to audit trails, the content rich analytical data may be captured by the analytics module 210 from any of transaction data (which may be a subset of an audit trail), device configuration information, language preferences, and so forth. The data may be utilized by the content generator engine 215 to dynamically generate informational content provided in response to a user request for informational content. According to some embodiments, informational content may be generated or selectively modified on-the-fly by the content generator engine 215 to provide end users with up to date informational content that is highly relevant to the preferences of the end users.

Additionally, because end users may utilize filters that are applied to actions they may perform on the publication server 110, the analytics module 210 may be adapted to determine filtering settings that were being utilized by the end user as they performed actions on the publication server 110. For example, when a document is opened, it may be valuable for content managers to know what filtering settings were applied so that content managers may understand the actual context of the content the end user was viewing.

Therefore, whenever a filtering condition is established for certain informational content, the filter conditions may be stored along with the audit trail via a unique filter key. Information developers may determine the actual informational content provided to the end user by applying the filter key associated with the informational content. Actual content may be viewed by applying the filter associated with the filter key to the informational content and displaying the actual content on a display device of a computing system.

It will be understood that if an end user resets or changes their filter, a new filter key may be associated with subsequent events relative to the end users utilizing informational content. According to some exemplary embodiments, a filter may be applied on an object-by-object basis (e.g., for each informational content utilized), or may be applied to all events associated with all informational content utilized by the end user.

The content generator engine 215 may be adapted to receive a search request for informational content from a graphical user interface generated by the user interface module 205. It will be appreciated that a search request may also include the selection of an informational topic.

Upon receiving the user request, the content generator engine 215 may cooperate with the analytics module 210 to dynamically generate informational content that substantially corresponds to analytical data generated by the analytics module 210.

In an exemplary operation, an end user may search a publishing server 110 for an installation manual for installing a particular apparatus. The end user inputs the search request utilizing a client device 105. The search request may be provided to the application 200 via a search interface generated by the user interface module 205.

The analytics module 210 may initially determine that the default language of the web browser application associated with the client device 105 is English. Additionally, the analytics module 210 may locate recent searches from the same client device 105 associated with the end user. The analytics module 210 may evaluate previous audit trails associated with the client device 105 by way of session keys, host key(s), and client device information to determine actions performed on the publishing server 110 during the current session.

Based upon the data included in the audit trails or current session data, the analytics module 210 may determine that the end user prefers conceptual informational content rather than highly technical informational content based upon the fact that the end user never or rarely downloads highly technical schematics, but rather only downloads marketing brochures. Moreover, the analytics module 210 may determine from the audit trails that the end user prefers instructional videos based upon the fact that the end user has opened numerous instructional videos several times in previous sessions. The content generator engine 215 may generate informational content that includes a conceptual overview of the apparatus along with an instructional video that explains details regarding the installation of the apparatus.

Rather than providing each end user with a static installation document that contains irrelevant information (which in this case includes overly technical information), the content generator engine 215 may provide the end user with highly relevant informational content. Moreover, because the application 200 may be adapted to correlate an end user (via an associated client device or a username) the application 200 may dynamically generate informational content that is specifically tailored to the preferences of each end user.

The content generator engine 215 may generate informational content by searching the database 120 for informational content that corresponds to the determined analytical data. Because, in some embodiments, the database 120 stores informational content in an XML compatible format, the content generator engine 215 may select various types of informational content (e.g., text, video, audio, image, and so forth) that may be easily combined together, as the various types of content are not stored in their native formats in some exemplary embodiments.

It is noteworthy that the application 200 may be adapted to allow information developers to replay end user sessions by recreating actions performed on the publishing server 110 that were stored in one or more audit trails. The ability for information developers to replay end user sessions allows the information developers to forensically analyze both the behavior of end users and the response of the publishing server 110 to end user actions.

In some embodiments, the application 200 may be executed on client devices 105 that may not be in continual communication with the publishing server 110. Ergo, the analytics module 210 may be adapted to aggregate audit trails that are then pushed to the application 200. The audit trails may be stored locally on the client device 105 when the client device 105 is offline (e.g., not communicatively coupled with the publishing server 110) and subsequently pushed to the publishing server 110 upon the client device accessing the network 115. The application 200 may also be adapted to allow information developers to purge old audit trails. Information developers may specify an appropriate amount of time for the retention of audit trails.

To ensure the security of end user data, client device 105 may interact with the application 200 via an application programming interface (API). The application 200 may assign a key to the API that is utilized by the client device 105 to authenticate the client device 105 when the client device 105 attempts to push audit trails to the application 200. Once the client device 105 communicatively couples with the application 200, the API key is validated and aggregated audit trails are pushed to the application 200.

In further illustrative embodiments, the application 200 may be adapted to generate analytical data regarding informational content that is provided to end users in binary format such as informational content embodied on compact disks, digital video disks, flash memory (e.g., universal serial bus flash drives), and so forth. Feedback, commentary, or other analytical data of the end users relative to the informational content may be pushed to the application 200 from the client device 105 on which the informational content resides.

Figure 3:
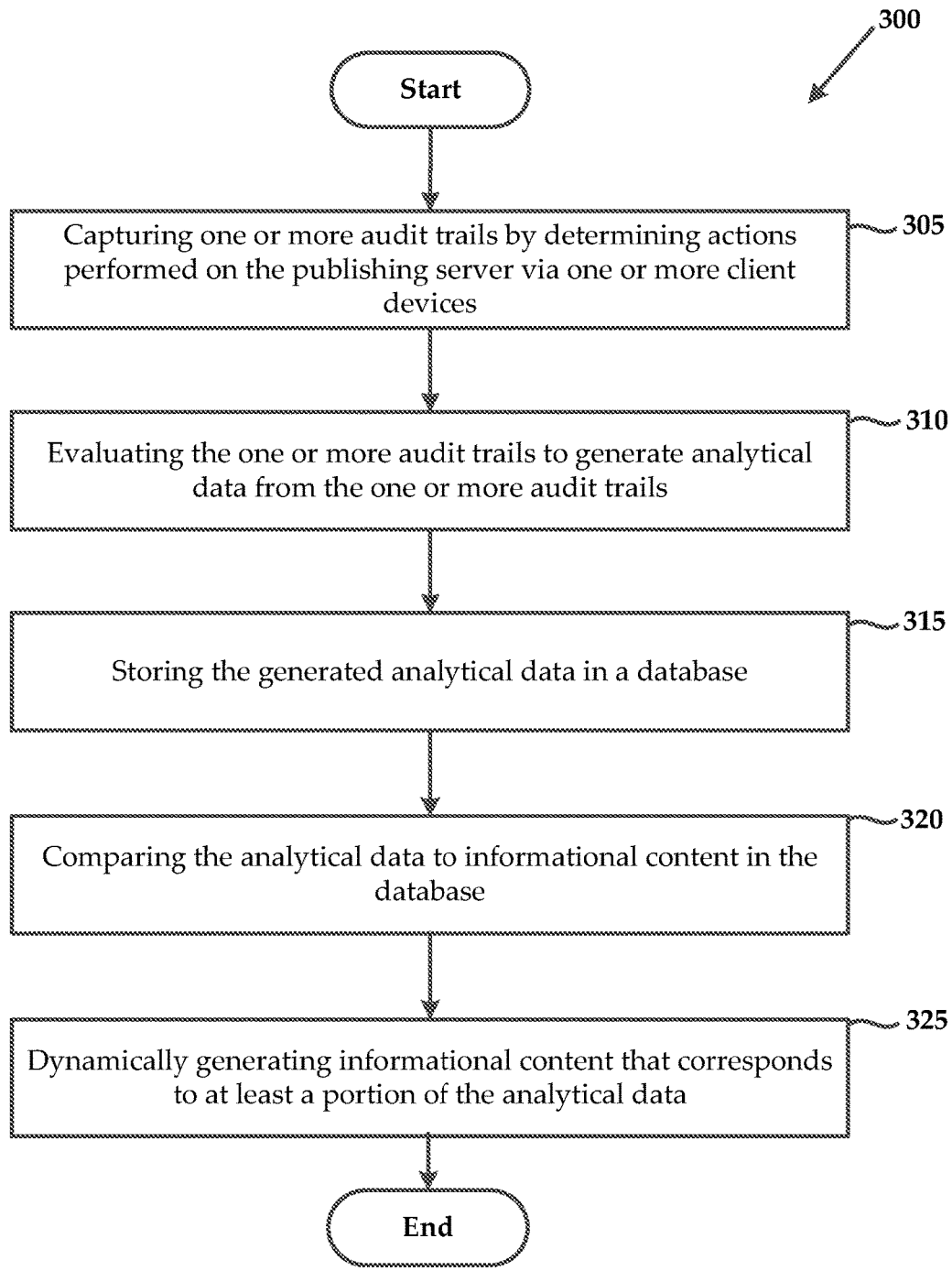
FIG. 3 is an exemplary flow diagram of a method for generating analytical data.

Referring now to FIG. 3, a flowchart illustrates an exemplary method 300 for generating analytical data and utilizing the generated analytical data to dynamically generate informational content. According to some embodiments, the method may include the step 305 of capturing one or more audit trails by determining actions performed on the publishing server 110 via one or more client devices. Step 305 may be performed on a plurality of publishing servers that each includes an application adapted for generating analytical data. The publishing server 110 may be adapted to publish informational content that is accessible to client devices.

The method may include the step 310 of generating analytical data from one or more audit trails. In addition to audit trails, analytical data may be generated from any of device configuration information, transaction data (which may be a subset of an audit trail), language preferences, and so forth.

After the step 310 of generating analytical data, the method 300 may include the step 315 of storing the generated analytical data in a database, along with the step 320 of comparing the analytical data to informational content in the database.

Finally, the method may include the step 325 of dynamically generating informational content that corresponds to at least a portion of the analytical data. That is, informational content is created based upon at least a portion of the analytical data rather than creating static informational content that is uniformly provided to each end user. As such, the informational content provided to end users is highly relevant to the preferences of the same.

Figure 4:
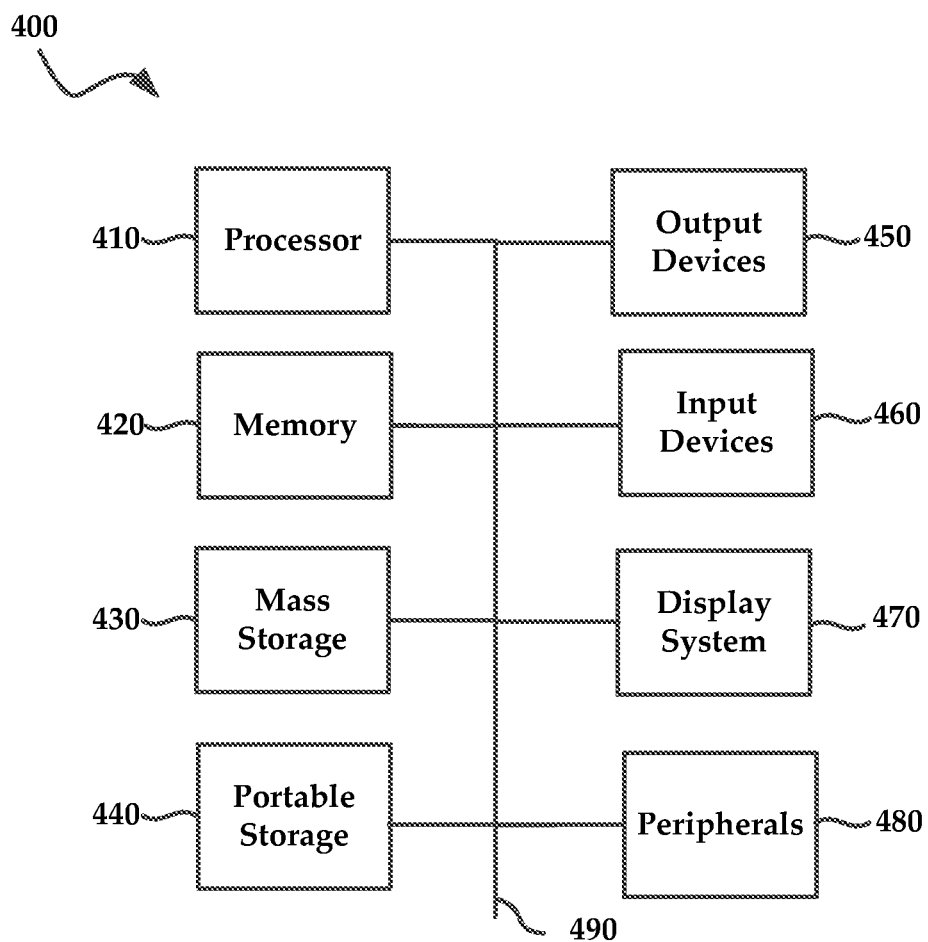
FIG. 4 is a block diagram of an exemplary computing system that may be utilized to practice aspects of the present technology.

FIG. 4 illustrates an exemplary computing system 400 that may be used to implement an embodiment of the present technology. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 440, and other peripheral devices 480.

The components shown in FIG. 4 are depicted as being connected via a single bus 490. The components may be connected through one or more data transport means. Processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 410.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

It is noteworthy that various modules and engines may be located in different places in various embodiments. Modules and engines mentioned herein can be stored as software, firmware, hardware, as a combination, or in various other ways. It is contemplated that various modules and engines can be removed or included in other suitable locations besides those locations specifically disclosed herein. In various embodiments, additional modules and engines can be included in the exemplary embodiments described herein.

The above description is illustrative and not restrictive. Many variations of the technology will become apparent to those of skill in the art upon review of this disclosure. The scope of the technology should, therefore, be determined not with reference to the above description, but instead should be determined with reference to the appended claims along with their full scope of equivalents.

What is claimed is:

1. A method for utilizing content rich analytical data, comprising:
   obtaining informational content via multiple channels including at least one of RSS feeds, news feeds, web content aggregators, web engines, social networking medias, search engines, online ad engines, banner engines, online news groups, and forums;
   storing the informational content in a Darwin Information Typing Architecture database in a native extensible markup language format, the stored informational content including at least one of interactive objects, media files, hotspots, and extensible markup language cross-references;
   capturing an audit trail during a user session;
   grouping a subset of correlated actions within the audit trail as a transaction by:
      capturing an opening action performed by an end user on one or more publishing servers using a client device associated with the end user, the client device communicatively coupled with the one or more publishing servers via a network, the one or more publishing servers adapted to publish informational content to the end user, the opening action performed by the client device on a document,
      determining actual informational content provided to the end user by applying a filter key associated with the informational content,
      generating a unique transaction key in response to the captured opening action performed by the client device on the document,
      correlating a subsequent XML cross referencing (XREF) action that is performed by the client device to the document opening action via the transaction key, the XML cross referencing action and created EXREF event relative to opening of the document,
      evaluating a natural language of informational content of the document opened by the client device, and
      generating a natural language preference for the natural language of the document based on the opening action and the correlated cross reference action;
   generating content rich analytical data from the audit trail, the content rich analytical data filtered and formatted based on a plurality of preferences that include the generated natural language preference generated from behavior of the end user including opening actions of the end user;
   obtaining informational content for the end user from the informational content stored in the database;
   translating the obtained informational content according to a language that corresponds to the generated natural language preference of the end user as determined from the content rich analytical data generated from the audit trail;
   reformatting the native extensible markup language format of the obtained informational content obtained from the database according to the generated natural language preference of the end user in a format for use by a web browser of the user client device to display the obtained informational content on the client device in a format that is perceivable to the end user; and
   providing the translated and formatted informational content to the end user.

2. The method according to claim 1, wherein capturing the audit trail includes:
   determining an initiation of a session by a client device accessing the one or more publishing servers;
   assigning a session key to the session;
   determining actions performed on the one or more publishing servers by the client device between the initiation and a termination of the session;
   associating each action performed during the session with the session key; and
   storing the actions performed on the one or more publishing servers as an audit trail.

3. The method according to claim 2, wherein generating content rich analytical data by evaluating the efficacy of a search transaction comprises:
   receiving a search request from the client device;
   correlating the search request to the transaction key;
   determining additional actions performed on the one or more publishing servers that are associated with the search transaction utilizing the transaction key; and
   evaluating the additional actions to determine the efficacy of the search transaction.

4. The method according to claim 2, wherein the audit trail is associated with a host key that associates the audit trail with the one or more publishing servers from which the audit trail was generated.

5. The method according to claim 2, further comprising storing the actions performed on the one or more publishing servers in the audit trail in chronological order.

6. The method according to claim 5, further comprising modeling at least a portion of a session by:
   recreating the actions performed on the one or more publishing servers on a publishing server utilizing at least a portion of the audit trail; and
   displaying the recreated actions on a display device of a computing system.

7. The method according to claim 1, wherein analytical data further includes client device configuration information via a web browser application associated with the client device.

8. The method according to claim 7, wherein the client device configuration information includes any of a media access control (MAC) address, an Internet protocol (IP) address, a web browser application type, a web browser application version, an operating system type, an operating system version, a hostname of the client device, session data associated with a cookie resident on the client device, and combinations thereof.

9. The method according to claim 1, wherein the natural language preference generated from the opening action further includes natural language information associated with informational content opened by a client device.

10. The method according to claim 1, wherein actions performed on a publishing server include any of searching, resolving, opening, printing, viewing, accessing, requesting, relative to informational content published by the one or more publishing servers.

11. The method according to claim 1, wherein informational content of the document includes any of a web page, an interactive object, a media file, a hotspot, an extensible markup language cross-reference, and combinations thereof.

12. The method according to claim 1, further comprising:
   determining a filtering condition utilized by a client device;
   associating a filter identification with at least a portion of the informational content of the document opened by the client device; and determining actual informational content provided to the client device utilizing the filter.

13. The method according to claim 1, further comprising:
aggregating a plurality of audit trails on the client device when the client device is offline; and
providing the plurality of audit trails to a publishing server when the client device communicatively connects to the one or more publishing servers.

14. The method according to claim 13, further comprising validating the client device via the one or more publishing servers utilizing an API key.

15. The method according to claim 1, further comprising:
comparing the generated analytical data to informational content in a database; and
dynamically generating informational content that corresponds to at least a portion of the analytical data by selecting informational content from the database.

16. The method according to claim 1, further comprising dynamically modifying informational content based upon analytical data corresponding to the informational content.

* * * * *